May 13, 1930.  L. M. RAKESTRAW  1,758,537
STERILIZER FOR BOTTLES
Filed Aug. 6, 1925
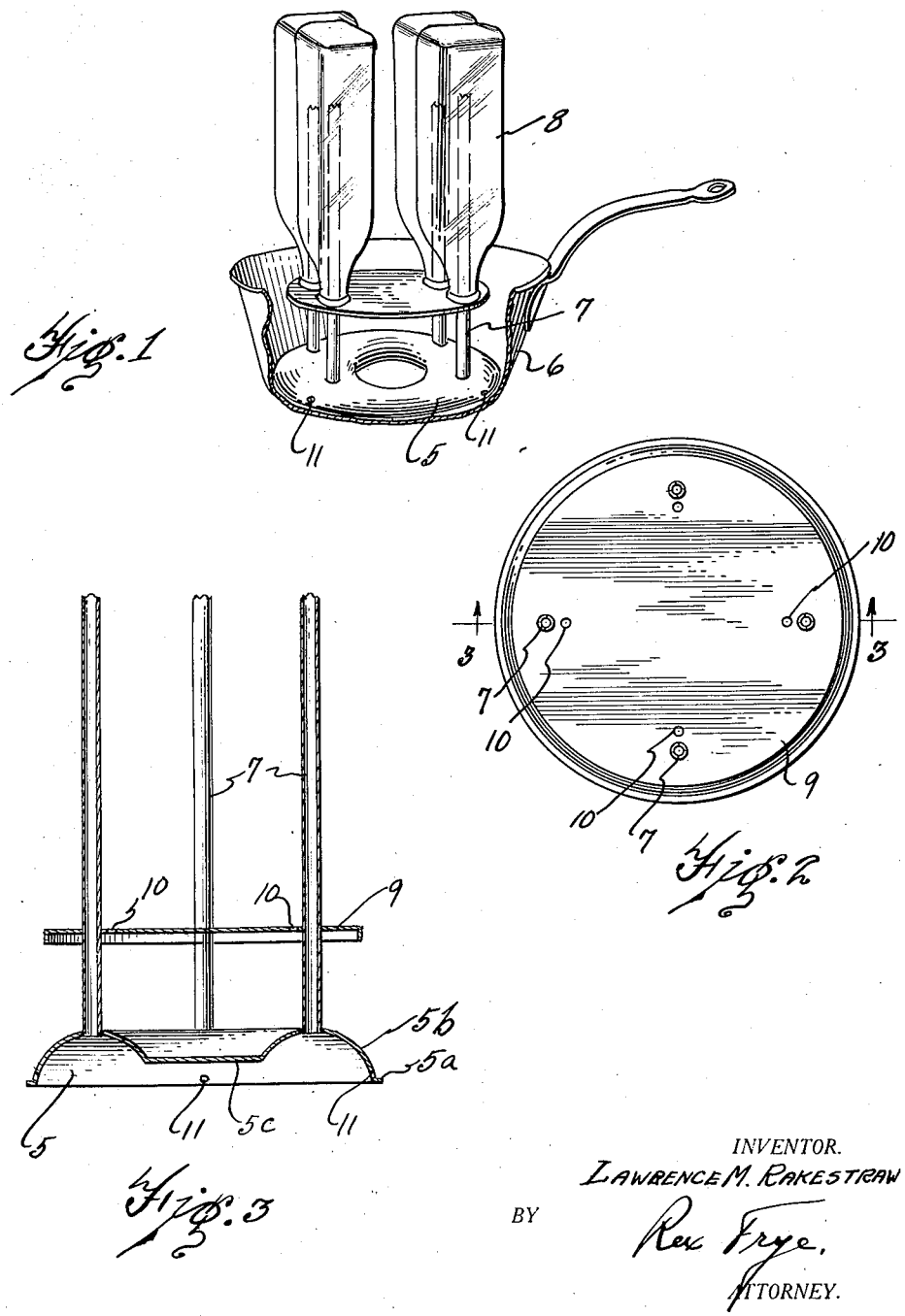
INVENTOR.
LAWRENCE M. RAKESTRAW
BY
Rex Frye,
ATTORNEY.

Patented May 13, 1930

1,758,537

UNITED STATES PATENT OFFICE

LAWRENCE M. RAKESTRAW, OF TOLEDO, OHIO, ASSIGNOR OF ONE-HALF TO NELSON J. QUINN, OF TOLEDO, OHIO

STERILIZER FOR BOTTLES

Application filed August 6, 1925. Serial No. 48,567.

This invention relates to apparatus for cleansing bottles, jars, cans and the like, and has for its principal object the provision of an apparatus whereby one or a plurality of receptacles may be thoroughly cleansed and sterilized in a minimum time.

Another object of this invention is the arrangement of a support for the bottles, etc., to be washed including a plurality of jets adapted to extend through the necks of inverted bottles and guide hot liquid and steam into contact with the bottoms of the bottles, whence it flows down the sides of the bottles and empties through the necks.

A further object of this invention is the mounting of a plurality of jets upon a curved base adapted to be immersed within a pan of cleansing fluid, such as water, whereby the heated fluid and steam will rise in and issue from the jets whenever sufficient heat is applied to the pan, a shelf or the like for supporting the bottles, etc., to be cleansed being arranged to assist in maintaining the jets in their desired positions.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a perspective view, with parts broken away, of my improved apparatus in position within a pan and with a plurality of bottles supported thereon.

Fig. 2 is a plan view of my improved cleansing apparatus, and

Fig. 3 is a central vertical section taken substantially on the line 3—3 of Fig. 2.

Referring now to the drawings, the numeral 5 designates the base of my improved cleansing and sterilizing apparatus, which, as best shown in Fig. 1, is adapted to rest upon the bottom of a pan 6. The base 5 is preferably shaped substantially as shown in Fig. 3 with a rim or bead $5^a$ at its lowermost portion for supporting the apparatus, an intermediate curved portion $5^b$ extending upwardly from the rim $5^a$ and then downwardly to merge with a central portion $5^c$ in a plane above the rim $5^a$ but below the uppermost portion of the raised intermediate portion $5^b$. A plurality of jets 7 are secured upon the base 5 adjacent its uppermost portion, and are preferably circumferentially spaced from each other, substantially as shown. By virtue of this construction the water or other cleansing fluid then beneath the base 5 is heated whenever heat is applied to the bottom of a pan 6 and the heated water and steam thereby generated rises from the uppermost portion of the base 5 through the jets 7 and when sufficient heat is applied will issue from the tops of the jets into engagement with bottles 8 or the like arranged to surround the upper portions of the jets.

The bottles or other receptacles 8 are preferably supported above the water or other cleansing fluid within the pan 6. In the illustrated embodiment I have shown a shelf 9 secured to the jets 7 intermediate their ends and adapted to extend just above the level of the water in the pan 6 whenever the base 5 of my cleansing apparatus rests upon the bottom of the pan. One or more drainage apertures 10 are arranged in the shelf 9 adjacent each jet 7 (note Figs. 2 and 3) to permit the cleansing fluid to escape from within the bottles 8 and return to the pan 6. Also a plurality of apertures 11 are preferably arranged in the base 5 to permit a continuous circulation of water from the pan 6 to enter the space beneath the base 5, whence it is transmitted through the jets 7 to the interiors of the bottles 8.

The operation of my improved cleansing and sterilizing apparatus is believed to be apparent. The apparatus is set within a pan 6 in substantially the position shown in Fig. 1 and water or other cleansing liquid placed within the pan to just below the plane of the shelf 9. Then one or more bottles 8 are inverted and lowered over the upper portions of the jets 7 until their necks rest upon the shelf 9 substantially as shown in Fig. 1. When heat is then applied to the bottom of the pan 6, the heated liquid and steam will rise in the jets 7 and issue from the tops of the jets into contact with the bottoms of the bottles 8, whence the cleansing fluid flows down the sides of the bottles and returns to the pan 6 through the drainage apertures 10 in the shelf 9. The steam and heated liquid thus not only thoroughly cleanse the interiors of the bottles, but when raised to the proper temperature will sterilize the bottles. The liquid returning to the pan 6 re-enters the space beneath the base 5 through the apertures 11, and accordingly, a circulatory system is established for the cleansing liquid.

It will also be noted that the operation of cleansing is practically automatic and needs no application of outside pressure, such as is often used when jets of comparatively high pressure steam are utilized for cleansing receptacles. In the present disclosure the steam and hot water is guided by the base to and then through the jets by the formation of the steam below the base, and not by the application of any external power. The steam utilized for cleaning is generated by the same heat used to heat the cleansing fluid, and the force of convection of the heated liquid is aided by the expansive power of the steam until an automatic circulatory cleansing operation is secured.

While water will serve as a suitable cleansing liquid in many instances, it will be apparent that any other suitable liquid may be utilized within the pan 6, or any desired ingredients can be added to the water to obtain a solution of a disinfectant or other purifying materials.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:

1. A cleanser and sterilizer for receptacles comprising a base adapted to be immersed in a pan of cleansing liquid with a portion in spaced relation to the bottom of the pan, a plurality of jets carried by the spaced portion of the base and adapted to convey the heated liquid and steam generated below the spaced portion of the base into contact with the interiors of receptacles surrounding the upper portions of the jets, and a support for the receptacles to be cleansed carried by and arranged to brace the jets.

2. A cleanser and sterilizer for receptacles comprising a base adapted to be immersed in a pan of cleansing liquid with a portion in spaced relation to the bottom of the pan, a plurality of jets carried by the spaced portion of the base and adapted to convey the heated liquid and steam generated below the spaced portion of the base into contact with the interiors of receptacles surrounding the upper portions of the jets, and a support for the receptacles to be cleansed comprising a shelf engaging the jets and spaced from said base and adapted to be engaged by the necks of inverted receptacles.

3. A cleanser and sterilizer for receptacles comprising a base adapted to be immersed in a pan of cleansing liquid with a portion in spaced relation to the bottom of the pan, a plurality of jets carried by the spaced portion of the base and adapted to convey the heated liquid and steam generated below the spaced portion of the base into contact with the interiors of receptacles surrounding the upper portions of the jets, and a support for the receptacles to be cleansed comprising a shelf engaging the jets and spaced from said base and adapted to be engaged by the necks of inverted receptacles, said shelf being provided with drainage openings.

4. Means for cleansing and sterilizing receptacles comprising a pan adapted to contain a cleansing liquid, a base adapted to be immersed in the liquid and having a raised portion adapted to be spaced from the bottom of the pan, a plurality of jets extending from the raised portion of the base above the surface of said liquid, and a support for the receptacles to be cleansed comprising a shelf carried by the jets above the surface of said liquid and having drainage apertures therein for returning liquid issuing from said jets to the pan.

In witness whereof I hereunto set my hand.

LAWRENCE M. RAKESTRAW.